(12) United States Patent  
Gim et al.

(10) Patent No.: US 7,173,653 B2  
(45) Date of Patent: Feb. 6, 2007

(54) IMAGING STABILIZER USING MICROMIRROR ARRAY LENS

(75) Inventors: Dong Woo Gim, Gyoungnam (KR); Gyoung Il Cho, Seoul (KR); Cheong Soo Seo, Seoul (KR)

(73) Assignees: Angstrom, Inc., Suwon (KR); Stereo Display, Inc., Anaheim, CA (US)

( * ) Notice: Subject to any disclaimer, the term of this patent is extended or adjusted under 35 U.S.C. 154(b) by 222 days.

(21) Appl. No.: 10/979,612

(22) Filed: Nov. 2, 2004

(65) Prior Publication Data

US 2005/0206737 A1 Sep. 22, 2005

Related U.S. Application Data

(63) Continuation-in-part of application No. 10/896,146, filed on Jul. 21, 2004, and a continuation-in-part of application No. 10/893,039, filed on Jul. 16, 2004, and a continuation-in-part of application No. 10/872,241, filed on Jun. 18, 2004, and a continuation-in-part of application No. 10/857,280, filed on May 28, 2004, now Pat. No. 6,999,226, and a continuation-in-part of application No. 10/857,714, filed on May 28, 2004, and a continuation-in-part of application No. 10/857,796, filed on May 28, 2004, now Pat. No. 6,934,073, and a continuation-in-part of application No. 10/855,287, filed on May 27, 2004, now Pat. No. 6,934,072, and a continuation-in-part of application No. 10/855,715, filed on May 27, 2004, now Pat. No. 7,031,046, and a continuation-in-part of application No. 10/855,554, filed on May 27, 2004, now Pat. No. 6,970,284, and a continuation-in-part of application No. 10/822,414, filed on Apr. 12, 2004, now Pat. No. 7,068,416, and a continuation-in-part of application No. 10/806,299, filed on Mar. 22, 2004, now Pat. No. 7,057,826.

(51) Int. Cl.  
*H04N 5/228* (2006.01)

(52) U.S. Cl. .................... 348/208.7; 348/335; 348/345

(58) Field of Classification Search ................ 348/335, 348/345  
See application file for complete search history.

(56) References Cited

U.S. PATENT DOCUMENTS 6,958,777 B1 * 10/2005 Pine ........................... 348/362  
2003/0184843 A1 * 10/2003 Moon et al. ................ 359/290

FOREIGN PATENT DOCUMENTS

JP 08-43881 * 2/1996

* cited by examiner

*Primary Examiner*—Tuan Ho

(57) ABSTRACT

A vibration correction device in an imaging device includes a micromirror array lens, configured to focus an object image onto an image sensor, and a vibration determination device, communicatively coupled to the micromirror array lens, configured to determine vibration of the imaging device and to generate a vibration correction signal. The micromirror array lens is adjusted to change its optical axis based at least in part on the vibration correction signal to correct for the vibration of the micromirror array lens. In one aspect, the micromirror array lens includes a plurality of micromirrors and the optical axis is changed by translation and/or rotation of the plurality of micromirrors. The advantages of the present invention include elimination of need for mechanical macromotions to adjust the optical axis, high sampling rate, simple structure, and flexibility to use any type of vibration determination device.

21 Claims, 6 Drawing Sheets

IMAGING STABILIZER USING MICROMIRROR ARRAY LENS

REFERENCE TO RELATED APPLICATIONS

This application is a continuation-in-part of, and claims priority to U.S. patent application Ser. No. 10/806,299, filed Mar. 22, 2004, now U.S. Pat. No. 7,057,826 U.S. patent application Ser. No. 10/822,414, filed Apr. 12, 2004, now U.S. Pat. No. 7,068,416 U.S. patent application Ser. No. 10/855,554, filed May 27, 2004, now U.S. Pat. No. 6,970,284 U.S. patent application Ser. No. 10/855,715, filed May 27, 2004, now U.S. Pat. No. 7,031,046 U.S. patent application Ser. No. 10/855,287, filed May 27, 2004, now U.S. Pat. No. 6,934,072 U.S. patent application Ser. No. 10/857,796, filed May 28, 2004, now U.S. Pat. No. 6,934,073 U.S. patent application Ser. No. 10/857,714, filed May 28, 2004, U.S. patent application Ser. No. 6,999,226 U.S. patent application Ser. No. 10/872,280, filed May 28, 2004, now U.S. Pat. No. 6,999,226 U.S patent application Ser. No. 10/872,241, filed Jun. 18, 2004, U.S. patent application Ser. No. 10/893,039, filed Jul. 16, 2004, U.S. patent application Ser. No. 10/896,146, filed Jul. 21, 2004, all of which are hereby incorporated by reference.

FIELD OF THE INVENTION

The present invention relates to optical systems in general and more specifically to vibration correction systems.

BACKGROUND OF THE INVENTION

A vibration correction device attempts to correct for vibrations in cameras caused by things such as handshaking by adjusting the tilt of the optical axis. The camera may then obtain clear images without blurring. In order to correct the vibration, the undesired angular velocity must be measured and a vibration correcting device must be employed to correct the vibration due to the undesired motions. Typically, an angular velocity detection sensor such as vibration gyro is adapted to detect the vibration, and the vibration correcting device uses a variable angle prism or movable lens system to correct the tilt of the optical axis caused by the vibration. However, imaging devices with conventional vibration correcting devices have several problems as described below.

For imaging devices or image pickup apparatuses, such as cameras, automation and multiplication are made in many functions such as auto exposure (AE) or auto focusing (AF). With increased complication and magnification, the vibration of the apparatus is a major factor in causing deterioration of the image quality. Even a small vibration may results in large vibrations in the image due to the long focal length and the narrow view angle for high magnification. Thus, several conventional vibration correcting devices have been designed.

There are mainly two methods to correct the vibration. One is electrical vibration correction, in which a vibration correcting program electrically corrects the amount of vibration from picked-up images obtained by an image sensor. The other method is optical vibration correction that corrects for vibration by correcting the tilt of optical axis due to the vibration. An angular velocity detection sensor such as vibration gyro is adapted to detect the vibration, and the optical vibration correcting device is employed to correct the vibration, as described in U.S. Pat. No. 6,734,902 B1. The optical vibration correction can be achieved by a variable angle prism or movable lens system.

Generally, optical vibration correction has advantages over electrical vibration correction. Since optical vibration correction removes the blurred image optically before the image sensor, it gives the clear images without blur. Also, because the optical vibration correction uses the pixels of the imaging sensor more effectively, it can provide better image quality. However, the conventional optical vibration correcting devices still have several problems. First, error in the correction of the picked-up image increases with an increase in the magnification of the image pickup lens. Second, macro mechanical motions are required. Third, they require complicated structures. Fourth, they have very low sampling frequencies. Fifth, they require a velocity detection sensor such as a vibration gyro.

FIGS. 1A–1C depict one embodiment of a prior art vibration correction device. FIG. 1A depicts the vibration correction device in operation when there is no vibration. FIG. 1B depicts the vibration correction device in operation with vibration but no correction. FIG. 1C depicts the vibration correction device in operation with vibration and correction. As depicted in FIGS. 1A–1C, the vibration correction device is located in an imaging device 11, such as a camera, video camera, or other type of imaging device. In the embodiment, the vibration correction device includes a lens 13, configured to focus an object image onto an image sensor 12. As shown in FIG. 1C, after the vibration amount is determined, the lens 13 is moved by macromovement to adjust the optical axis 14 of the lens 13. In other words, the system takes clear images when there is no vibration as shown in FIG. 1A. If there is vibration, the optical axis of the system is tilted by the vibration and the image sensor has the blurred image in FIG. 1B. From the obtained the angular velocity by the detecting sensor utilizing the vibration gyro, the vibration of imaging device is obtained and the lens system moves up, down, left, or right to correct the tilt of optical axis and the imaging device obtains the clear images without blur, as shown in FIG. 1C.

FIGS. 2A–2C depict one embodiment of a prior art vibration correction device using a variable angle prism. FIG. 2A depicts the vibration correction device in operation when there is no vibration. FIG. 2B depicts the vibration correction device in operation with vibration but no correction. FIG. 2C depicts the vibration correction device in operation with vibration and correction. In the embodiment depicted in FIGS. 2A–2C, a variable angle prism 23 is adjusted to change the optical axis 24 of the system, so that the image is focused onto the image sensor 22. The system also includes an auxiliary glass 21. In other words, in FIG. 2A, the optical axis is not tilted when there is no vibration. If there is vibration but it is not corrected, the tilt of optical axis results in the blurred image on the image sensor. By changing the refraction angle of prism with the vibration correction amount, the tilt of optical axis is corrected and the imaging device obtains the clear images, as shown in FIG. 2C.

Therefore, what is needed is an imaging stabilizer that does not require macromotions.

SUMMARY OF INVENTION

The present invention addresses the problems of the prior art and provides an imaging stabilizer (vibration correction device) using a micromirror array lens.

In one embodiment, a vibration correction device in an imaging device includes a micromirror array lens, configured to focus an object image onto an image sensor, and a vibration determination device, communicatively coupled to the micromirror array lens, configured to determine vibration of the imaging device and to generate a vibration correction signal. The micromirror array lens is adjusted to change its optical axis based at least in part on the vibration correction signal to correct for the vibration of the micromirror array lens.

In one aspect, the micromirror array lens includes a plurality of micromirrors and the optical axis is changed by translation of the plurality of micromirrors and/or rotation of the plurality of micromirrors. In another aspect, the vibration determination device includes an angular velocity detection sensor.

In another aspect, the image sensor is optically coupled to the micromirror array lens, and is configured to sense the object image focused by the micromirror array lens and to generate an image sensor signal, and the vibration determination device includes an image processing unit, configured to determine the vibration of the micromirror array lens based at least in part on the image sensor signal. In one aspect, the image processing unit uses an algorithmic process to evaluate the image sensor signal to determine the vibration of the micromirror array lens. In one aspect, the algorithmic process includes comparing a reference point on the image sensor to a corresponding shifted point on the image sensor.

In another aspect, the vibration correction device also includes a beam splitter, optically coupled to the micromirror array lens, configured to change a direction of light beams reflected by the micromirror array lens toward the image sensor.

In another embodiment, a method in a vibration correction device embodied in an imaging device includes determining a vibration of the imaging device using an angular velocity detection sensor, changing an optical axis of the micromirror array lens based at least in part on the determined vibration of the imaging device to correct for the determined vibration of the imaging device, and focusing an object image onto an image sensor using a micromirror array lens. In one aspect, the changing of the optical axis of the micromirror array lens includes rotating and/or translating a micromirror of the micromirror array lens.

In another embodiment, a method in a vibration correction device embodied in an imaging device includes focusing an object image onto an image sensor using a micromirror array lens, determining a vibration of the imaging device based at least in part on information from the image sensor regarding the object image focused by the micromirror array lens, and changing an optical axis of the micromirror array lens based at least in part on the determined vibration of the imaging device to correct for the determined vibration of the imaging device.

The advantages of the present invention include elimination of need for mechanical macromotions to adjust the optical axis, high sampling rate, simple structure, and flexibility to use any type of vibration determination device.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A vibration correction device (imaging stabilizer) using a micromirror array lens (MMAL) corrects for vibrations by controlling translations and rotations of mirrors to correct the tilt of the optical axis of the MMAL. Therefore, macromotions are not needed to change the direction of the optical axis of the MMAL, as described in U.S. patent application Ser. No. 10/855,715, 10/855,287, 10/857,280, and 10/857,714, all of which are hereby incorporated by reference. Furthermore, changes to the optical axis of the MMAL may be performed very rapidly so that a high sampling rate may be achieved.

Figure 1A:
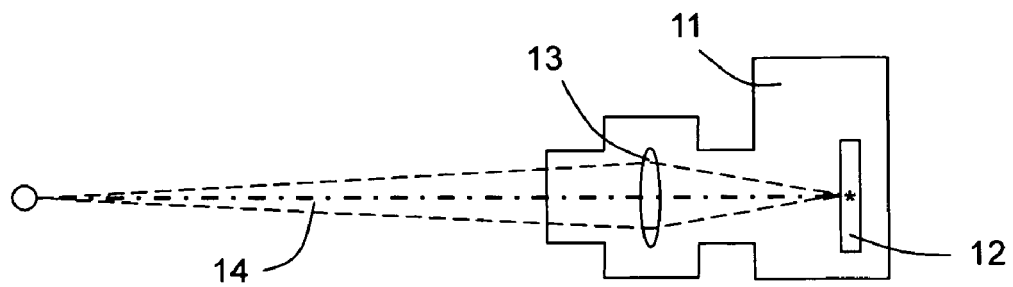
FIGS. 1A–1C depict one embodiment of a prior art vibration correction device.
Figure 1B:
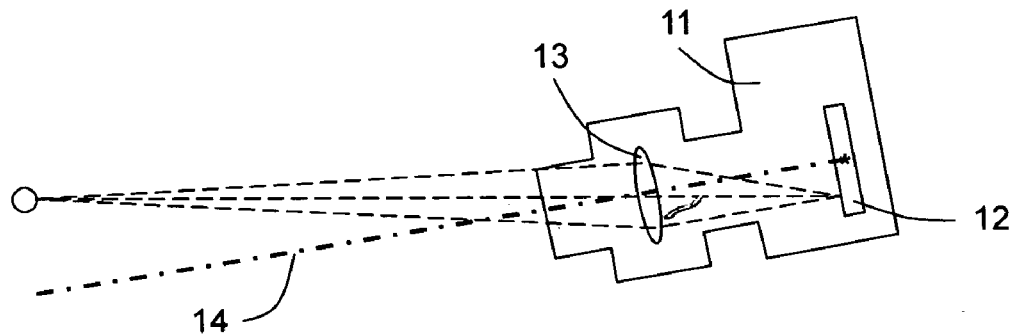
Figure 1C:
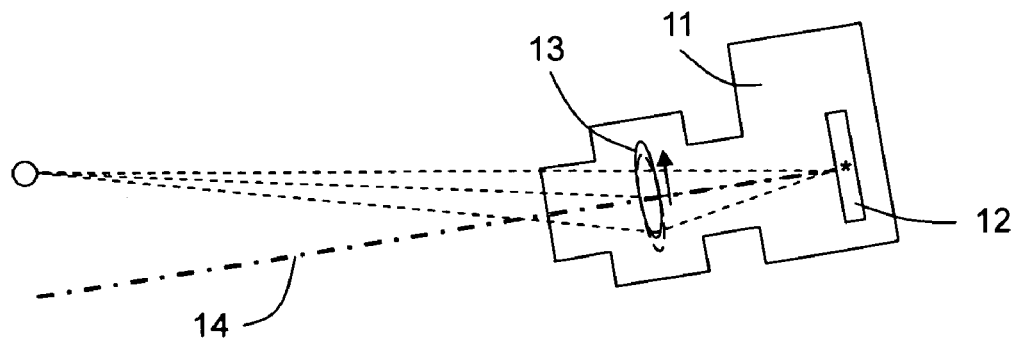
Figure 2A:
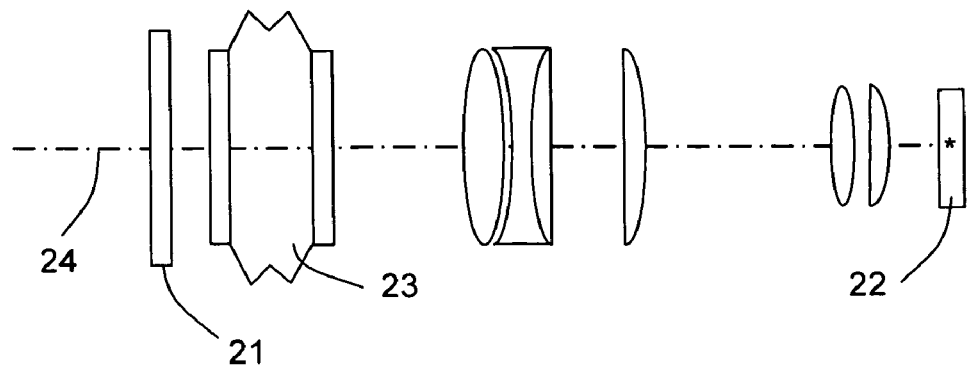
FIGS. 2A–2C depict one embodiment of a prior art vibration correction device using a variable angle prism.
Figure 2B:
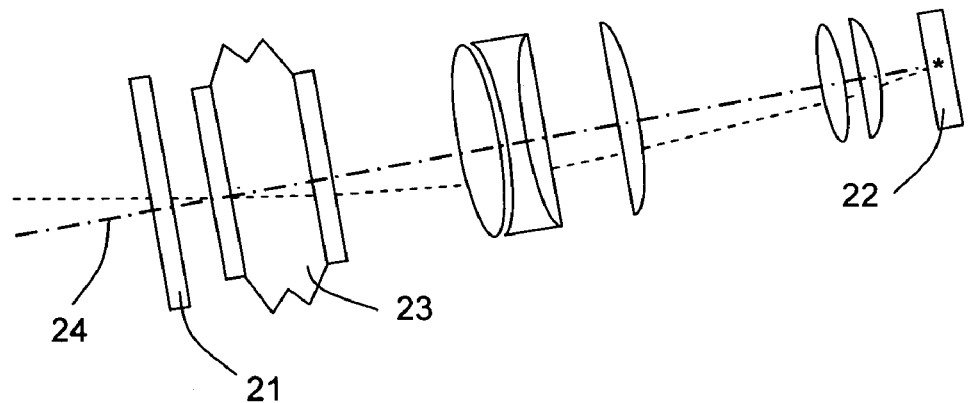
Figure 2C:
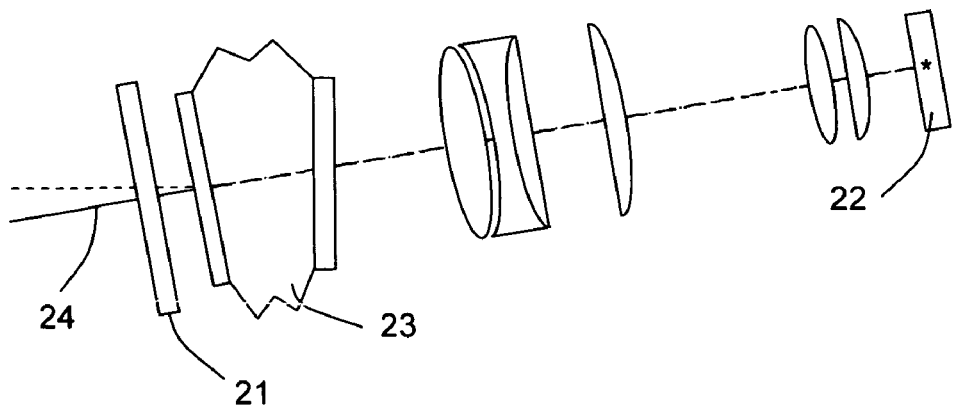
Figure 3A:
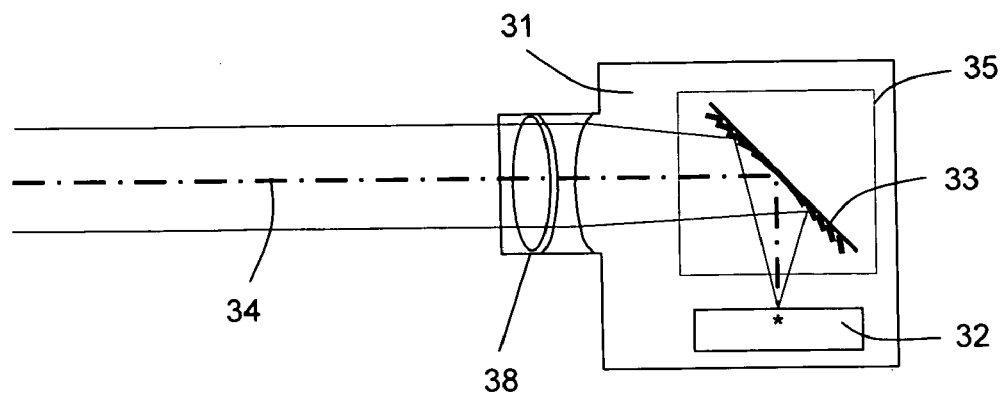
FIGS. 3A–3B depict a vibration correction device using a micromirror array lens, according to an embodiment of the invention.
Figure 3B:
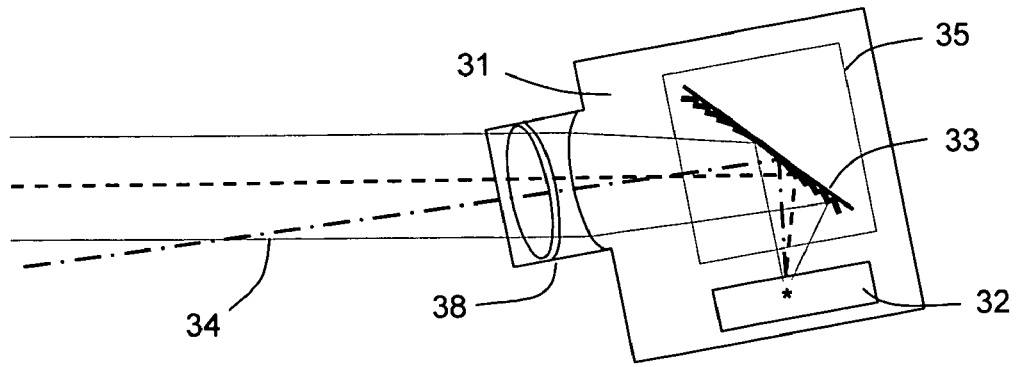

FIGS. 3A–3B depict a vibration correction device using a micromirror array lens, according to an embodiment of the invention. The vibration correction device using a MMAL corrects for vibration without any macromotion. In FIG. 3B, the optical axis 34 is tilted when there is vibration. However, as shown in FIG. 3B, without any movement of the MMAL itself, the tilt of optical axis 34 is corrected by controlling translations and rotations of micromirrors, as described further below with reference to FIGS. 3A–6.

FIG. 3A depicts the vibration correction device 35 in operation when there is no vibration. FIG. 3B depicts the vibration correction device 35 in operation with vibration and correction. As depicted in FIGS. 3A–3B, the imaging device 31, such as a camera, video camera, or other type of imaging device, includes a conventional lens system 38, the vibration correction device 35, and an image sensor 32. In the embodiment, the vibration correction device 35 includes a micromirror array lens 33, configured to focus an object image onto an image sensor 32 and to correct optical axis error. In one embodiment, the vibration correction device 35 also includes a vibration determination device, communicatively coupled to the micromirror array lens 33, configured to determine a vibration amount (vibration) of the imaging device 31 and to generate a vibration correction signal. The vibration amount is the amount of vibration experienced by the imaging device 31. From the measured vibration amount, a necessary optical axis change of the micromirror array lens 33 is determined. The vibration amount may include a motion vector and its magnitude. The vibration determination device is not shown in FIGS. 3A–3B because any type of vibration determination device may be used in conjunction with the vibration correction device 35. For example, in FIG. 4 an angular velocity sensor 36 is used in the vibration determination device, and in FIG. 5 an image processing unit 37 is used in the vibration determination device. Other types of vibration determination devices are also possible.

Referring again to FIGS. 3A–3B, the micromirror array lens 33 is adjusted to change its optical axis 34, based at least in part on the vibration correction signal to correct for the vibration of the imaging device 31. That is, by changing the optical axis (tilt of the optical axis) 34, vibration correction is performed.

In one embodiment, the micromirror array lens 33 includes a plurality of micromirrors and the optical axis 34 is changed by translation of the plurality of micromirrors and/or rotation of the plurality of micromirrors.

Figure 4:
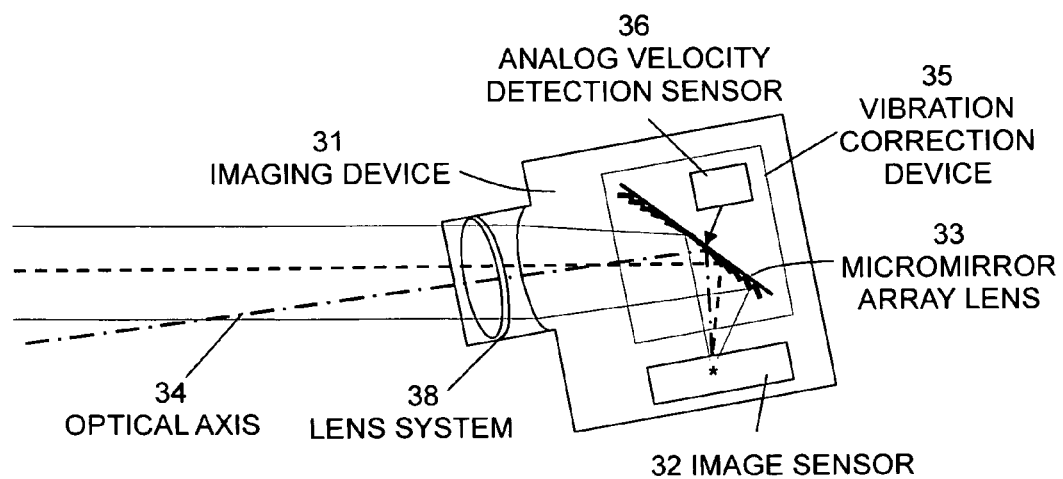
FIG. 4 depicts a vibration correction device using a micromirror array lens, according to another embodiment of the invention.

FIG. 4 depicts a vibration correction device using a micromirror array lens, according to an embodiment of the invention. As mentioned above with respect to FIGS. 3A–3B, the vibration determination device shown in FIG. 4 includes an angular velocity detection sensor 36. The angular velocity detection sensor 36 may be, for example, a vibration gyro or other type of angular velocity detection sensor.

Figure 5:
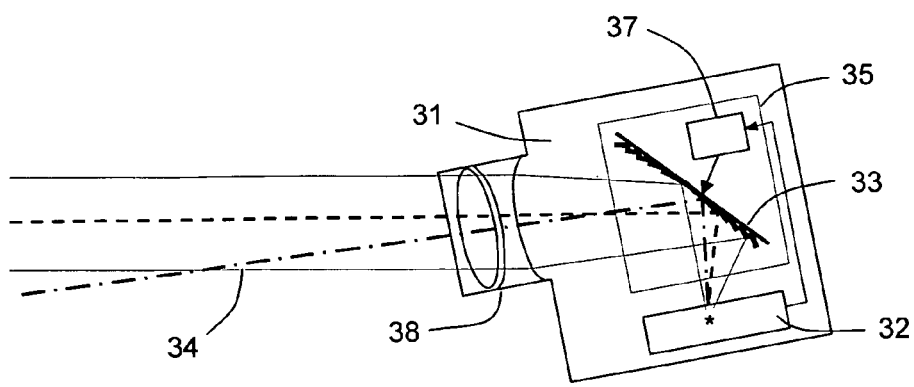
FIG. 5 depicts a vibration correction device using a micromirror array lens, according to another embodiment of the invention.

FIG. 5 depicts a vibration correction device using a micromirror array lens, according to another embodiment of the invention. As mentioned above with respect to FIGS. 3A–3B, the vibration determination device shown in FIG. 5 includes an image processing unit 37. In the embodiment depicted in FIG. 5, the image sensor 32 is optically coupled to the micromirror array lens 33 and configured to sense the object image focused by the conventional lens system 38 and the micromirror array lens 33 and to generate an image sensor signal. The vibration determination device includes the image processing unit 37, configured to determine the vibration of the imaging device 31 based at least in part on the image sensor signal. In one embodiment, the image processing unit 37 uses an algorithmic process to evaluate the image sensor signal to determine the vibration of the imaging device 31. In another embodiment, the algorithmic process includes comparing a reference point on the image sensor 32 with a corresponding shifted point on the image sensor 32.

Figure 6:
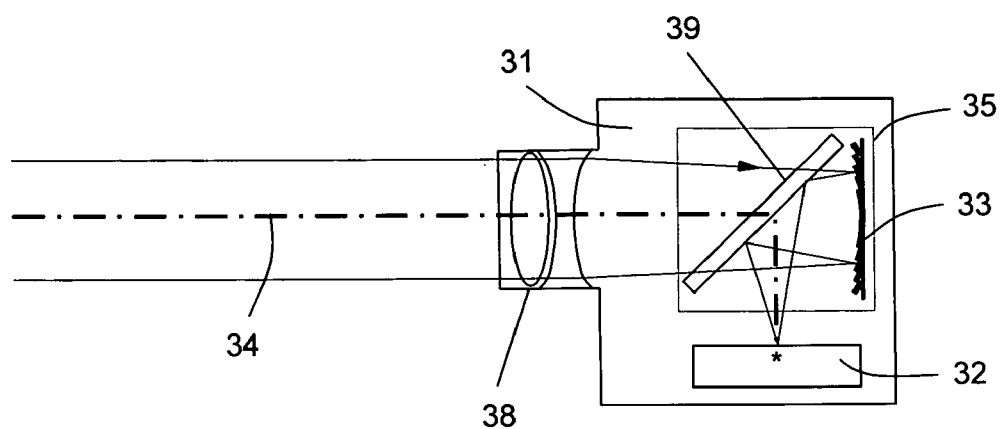
FIG. 6 depicts a vibration correction device using a micromirror array lens and a beam splitter, according to an embodiment of the invention.

FIG. 6 depicts a vibration correction device using a micromirror array lens and a beam splitter, according to an embodiment of the invention. In the embodiment, the vibration correction device 35 includes a beam splitter 39, optically coupled to the micromirror array lens 33, configured to change a direction of light beams reflected by micromirror array lens 33 toward image sensor 32. The beamsplitter 39 may be placed with 45° or any other angle to have the reflected light go to image sensor 32.

Figure 7:
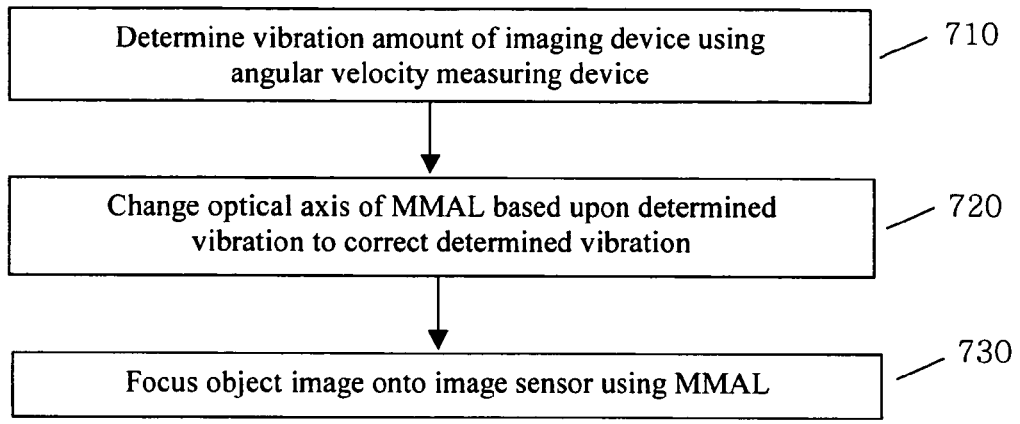
FIG. 7 is a flow diagram of a method in a vibration correction device, according to an embodiment of the invention.

FIG. 7 is a flow diagram of a method in a vibration correction device embodied in an imaging device, according to an embodiment of the invention. At step 710, a vibration (vibration amount) of the imaging device is determined using an angular velocity detection sensor. At step 720, an optical axis of the micromirror array lens is changed based at least in part on the determined vibration of the imaging device to correct for the determined vibration of the imaging device. At step 730, an object image is focused onto an image sensor using a micromirror array lens. The object image may also be focused using a micromirror array lens and a conventional lens system. By correcting for the determined vibration, a clear object image is may be obtained by the image sensor.

Figure 8:
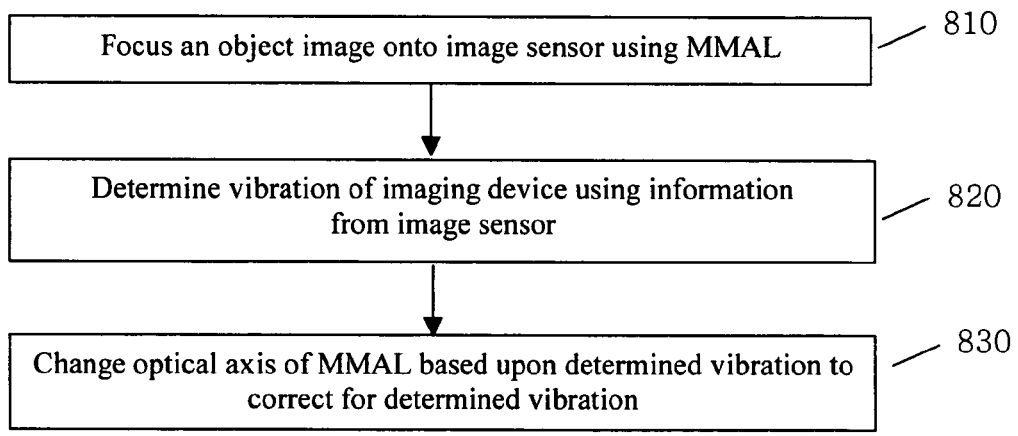
FIG. 8 is a flow diagram of a method in a vibration correction device, according to another embodiment of the invention.

FIG. 8 is a flow diagram of a method in a vibration correction device embodied in an imaging device, according to another embodiment of the invention. At step 810, an object image is focused onto an image sensor using a micromirror array lens. The object image may also be focused using a micromirror array lens and a conventional lens system. At step 820, a vibration of the imaging device is determined based at least in part on information from the image sensor regarding the object image focused by the micromirror array lens. The vibration derived from the information from the image sensor regarding the object image may include a motion vector and its magnitude. The determined correction amount is communicated to the micromirror array lens. At step 830, an optical axis of the micromirror array lens is changed based at least in part on the determined vibration of the imaging device to correct for the determined vibration of the imaging device. By correcting for the determined vibration, a clear object image is may be obtained by the image sensor.

The advantages of the present invention include elimination of need for mechanical macromotions to adjust the optical axis, high sampling rate, simple structure, and flexibility to use any type of vibration determination device.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A vibration correction device in an imaging device, comprising:
    a micromirror array lens, configured to focus an object image onto an image sensor; and
    a vibration determination device, communicatively coupled to the micromirror array lens, configured to determine vibration of the imaging device and to generate a vibration correction signal,
    wherein, the micromirror array lens is adjusted to change its optical axis based at least in part on the vibration correction signal to correct for the vibration of the micromirror array lens.

2. The vibration correction device of claim 1, wherein:
    the micromirror array lens includes a plurality of micromirrors and wherein the optical axis is changed by adjusting at least one of the group consisting of:
    translation of the plurality of micromirrors; and
    rotation of the plurality of micromirrors.

3. The vibration correction device of claim 1, wherein:
    the vibration determination device includes an angular velocity detection sensor.

4. The vibration correction device of claim 2, wherein:
    the vibration determination device includes an angular velocity detection sensor.

5. The vibration correction device of claim 1, wherein:
    the image sensor is optically coupled to the micromirror array lens, configured to sense the object image focused by the micromirror array lens and to generate an image sensor signal; and the vibration determination device includes an image processing unit, configured to determine the vibration of the micromirror array lens based at least in part on the image sensor signal.

6. The vibration correction device of claim 5, wherein:
the image processing unit uses an algorithmic process to evaluate the image sensor signal to determine the vibration of the micromirror array lens.

7. The vibration correction device of claim 6, wherein:
the algorithmic process includes comparing a reference point on the image sensor to a corresponding shifted point on the image sensor.

8. The vibration correction device of claim 2, wherein:
the image sensor is optically coupled to the micromirror array lens, configured to sense the object image focused by the micromirror array lens and to generate an image sensor signal; and
the vibration determination device includes an image processing unit, configured to determine the vibration of the micromirror array lens based at least in part on the image sensor signal.

9. The vibration correction device of claim 8, wherein:
the image processing unit uses an algorithmic process to evaluate the image sensor signal to determine the vibration of the micromirror array lens.

10. The vibration correction device of claim 9, wherein:
the algorithmic process includes comparing a reference point on the image sensor to a corresponding shifted point on the image sensor.

11. The vibration correction device of claim 1, further comprising:
a beam splitter, optically coupled to the micromirror array lens, configured to change a direction of light beams reflected by the micromirror array lens toward the image sensor.

12. The vibration correction device of claim 3, further comprising:
a beam splitter, optically coupled to the micromirror array lens, configured to change a direction of light beams reflected by the micromirror array lens toward the image sensor.

13. The vibration correction device of claim 8, further comprising:
a beam splitter, optically coupled to the micromirror array lens, configured to change a direction of light beams reflected by the micromirror array lens toward the image sensor.

14. A method in a vibration correction device embodied in an imaging device, comprising:

determining a vibration of the imaging device using an angular velocity detection sensor;
changing an optical axis of the micromirror array lens based at least in part on the determined vibration of the imaging device to correct for the determined vibration of the imaging device; and
focusing an object image onto an image sensor using a micromirror array lens.

15. The method of claim 14, wherein:
the changing of the optical axis of the micromirror array lens includes translating a micromirror of the micromirror array lens.

16. The method of claim 14, wherein:
the changing of the optical axis of the micromirror array lens includes rotating a micromirror of the micromirror array lens.

17. The method of claim 15, wherein:
the changing of the optical axis of the micromirror array lens includes rotating a micromirror of the micromirror array lens.

18. A method in a vibration correction device embodied in an imaging device, comprising:
focusing an object image onto an image sensor using a micromirror array lens;
determining a vibration of the imaging device based at least in part on information from the image sensor regarding the object image focused by the micromirror array lens; and
changing an optical axis of the micromirror array lens based at least in part on the determined vibration of the imaging device to correct for the determined vibration of the imaging device.

19. The method of claim 18, wherein:
the changing of the optical axis of the micromirror array lens includes translating a micromirror of the micromirror array lens.

20. The method of claim 18, wherein:
the changing of the optical axis of the micromirror array lens includes rotating a micromirror of the micromirror array lens.

21. The method of claim 19, wherein:
the changing of the optical axis of the micromirror array lens includes rotating a micromirror of the micromirror array lens.

* * * * *